(12) United States Patent
Palmlöf et al.

(10) Patent No.: US 7,041,744 B2
(45) Date of Patent: May 9, 2006

(54) METHOD FOR CROSS-LINKING A POLYMER ARTICLE

(75) Inventors: Magnus Palmlöf, Vastra Frolunda (SE); Carl-Gustaf Ek, Vastra Frolunda (SE); Gunhild Rohne, Gjovik (NO)

(73) Assignee: Borealis Technology Oy, Porvoo (FI)

( * ) Notice: Subject to any disclaimer, the term of this patent is extended or adjusted under 35 U.S.C. 154(b) by 0 days.

(21) Appl. No.: 10/476,518

(22) PCT Filed: Mar. 21, 2002

(86) PCT No.: PCT/EP02/03195

§ 371 (c)(1),
(2), (4) Date: Apr. 22, 2004

(87) PCT Pub. No.: WO02/096962

PCT Pub. Date: Dec. 5, 2002

(65) Prior Publication Data

US 2004/0167293 A1    Aug. 26, 2004

(30) Foreign Application Priority Data

May 11, 2001 (EP) ................................. 01111570

(51) Int. Cl.
*C08F 130/08* (2006.01)
*C08F 230/08* (2006.01)
*C08F 30/08* (2006.01)

(52) U.S. Cl. .................... 525/326.5; 525/343; 525/353
(58) Field of Classification Search ............. 525/326.5, 525/344, 353, 355, 343
See application file for complete search history.

(56) References Cited

U.S. PATENT DOCUMENTS 4,446,283 A * 5/1984 Doi et al. .................... 525/344
4,618,645 A * 10/1986 Bauman et al. ............. 524/745
6,005,055 A * 12/1999 Dammert et al. ........ 525/326.5

OTHER PUBLICATIONS

Birley et al., Plastics Materials-properties and applications, 2$^{nd}$ Edition, Blackie & Son Limited (1988).*

* cited by examiner

*Primary Examiner*—Ling-Sui Choi
(74) *Attorney, Agent, or Firm*—Fay, Sharpe, Fagan, Minnich & McKee, LLP

(57) ABSTRACT

The present invention relates to a method for cross-linking a polymer article which comprises a cross-linkable polymer with hydrolyzable silane groups and a crystallinity level of at least 30%. The cross-linking is performed in the presence of a silanol condensation catalyst comprising a compound of formula (I): $ArSO_3H$ or a precursor thereof, Ar being a hydrocarbyl substituted aromatic group comprising at least 14 carbon atoms.

20 Claims, 1 Drawing Sheet

METHOD FOR CROSS-LINKING A POLYMER ARTICLE

The present invention relates to a method for cross-linking a polymer article which comprises a cross-linkable polymer with hydrolysable silane groups.

To improve the properties of polymer products such as mechanical strength and heat resistance, it is known to cross-link polymers by the use of different additives. For this purpose the polymer must include cross-linkable groups as e.g. silane groups. For polymers containing silane groups the cross-linking is performed in the presence of water (moisture curing) which leads to the hydrolization of the silane groups and subsequently to cross-linking of the resulting silanol groups by splitting off water molecules.

To achieve cross-linking of the silanol groups resulting from the silane groups it is known that a silanol condensation catalyst must be used. Prior art silanol condensation catalysts include carboxylates of metals, such as tin, zinc, iron, lead and cobalt, organic bases, inorganic acids, and organic acids. In particular, tin carboxylates have found wide-spread application. However, with these prior art silanol condensation catalysts a satisfactory degree of cross-linking is obtained only if the polymer is treated at elevated temperatures in the order of 80 to 100° C. and elevated humidity levels. Therefore, cross-linking in the presence of these prior art catalysts requires the use of water baths or steam cabinets for the cross-linking procedure. This is a considerable disadvantage because of the costs for these facilities and for the production of hot steam, particularly if the polymer articles to be cross-linked have large dimensions. Furthermore, the standard catalysts as e.g. tin catalysts comprise heavy metal atoms which can cause environmental problems.

From WO 95/17463 cross-linkable polymer compositions are known which comprise aromatic sulphonic acid compounds as silanol condensation catalysts which in general provide for a more rapid cross-linking as the above-cited prior art catalysts at the same temperature. The contents of this document is included herein by reference.

However, the cross-linking of polymer articles comprising medium to high density polymers, such as pipes which are of special interest for the present invention, is known to be difficult due to the enhanced crystallinity of these materials which prevents to a large extent the penetration of water into the polymer. In this respect it is referred to the documents PlastVerarbeiter 36, Jahrgang 1985, Nr. 8 and J. Brandrup, E. H. Immergut, Polymer Handbook, 3rd edition, 1989. For example, the permeability coefficient at 25° C. for LDPE with a density of 0.914 g/cm$^3$ is $68 \cdot 10^{13}$ and for HDPE with a density of 0.964 g/cm$^3$ is only $9 \cdot 10^{13}$, i.e. more than seven times lower for HDPE.

It is therefore an object of the present invention to provide a method for cross-linking of a polymer article comprising a cross-linkable medium to high density polymer with hydrolysable silane groups which avoids the above-described disadvantages of the prior art methods.

It has now surprisingly been found that lipophilic aromatic sulphonic acids can be applied as silanol condensation catalysts for the cross-linking of polymer articles comprising polymers with an elevated degree of crystallinity.

The present invention therefore provides a method for cross-linking a polymer article comprising a cross-linkable polymer with hydrolysable silane groups and a crystallinity level of at least 30% wherein the cross-linking is performed in the presence of a silanol condensation catalyst comprising a compound of formula (I):

$$ArSO_3H \qquad (I)$$

or a precursor thereof, Ar being a hydrocarbyl substituted aromatic group comprising at least 14 carbon atoms.

The inventive method allows for the cross-linking to be carried out at low temperatures such as room temperature and therefore no special devices as e.g. water baths or steam cabinets are necessary to perform the cross-linking step. This is of particular advantage for the cross-linking of pipes which can reach lengths up to several hundred meters and especially for coated steel pipes or aluminium multilayer pipes which cannot be coiled due to their rigidity. In addition, also the energy consumption of the method is reduced as there is no need to produce hot steam for the cross-linking. Furthermore, the inventive method has the advantage that the scorch sensitivity, i.e. the undesired pre-cross-linking in the extruder, is lowered.

The silanol condensation catalyst of the inventive method must be sufficiently lipophilic to be compatible with the polymer to be cross-linked. Otherwise, the catalyst will be released from the polymer upon cross-linking in aqueous solution, thus impairing cross-linking efficiency. Therefore, the hydrocarbyl-substituted aromatic group must contain at least 14 carbon atoms.

In a preferred embodiment, Ar in formula (I) is a hydrocarbyl substituted benzene or naphthalene ring whereby the hydrocarbyl radical or radicals contain 8 to 20 carbon atoms in the benzene case and 4 to 18 carbon atoms in the naphthalene case. Further preferred, the hydrocarbyl radical is an alkyl substituent having 10–18 carbon atoms and most preferred the alkyl substituent contains 12 carbon atoms and is selected from dodecyl and tetrapropyl.

Preferably, due to commercial availability, the aryl-group is a benzene ring substituted with an alkyl substituent containing 12 carbon atoms.

In a particularly preferred embodiment the silanol condensation catalyst is selected from the group of dodecyl benzene sulphonic acid and tetrapropyl benzene sulphonic acid.

The silanol condensation catalyst used in the inventive method may also be a precursor of the compound of formula (I), i.e. a compound that is converted by hydrolysis to a compound of formula (I). For example, such precursors may be an acid anhydride of the sulphonic acid compound of formula (I) or a sulphonic acid of formula (I) that has been provided with a hydrolysable protective group, preferably an acetyl protective group.

The amount of silanol condensation catalysts present in the cross-linkable polymer preferably is in the order of about 0.001 to 3% by weight, preferably about 0.001 to 2% by weight and most preferably about 0.005 to 1% by weight based on the total weight of the polymer. The effective amount of catalysts will, however, depend on the molecular weight of the catalyst actually used. Thus, a smaller amount is required of a catalyst with a low molecular weight and a higher amount is required in the case of a catalyst with a high molecular weight.

Preferably, in the inventive method the silanol condensation catalyst is added to the cross-linkable polymer in the form of a master batch, i.e. in the form mixed with a polymer, such as e.g. a homo or copolymer of ethylene. The master batch contains preferably about 0.02 to 5% by weight, more preferably about 0.05 to 2% by weight of the catalyst.

Preferably, the inventive method is carried out at a temperature of at most 80° C., more preferably at most 60° C. and most preferably at most 40° C. In a particular preferred embodiment the inventive method is carried out at room temperature (20 to 25° C.) or below room temperature.

It is further preferred that the inventive method is performed by subjecting the polymer article to air with a relative humidity of above 40%, more preferably 100%. This embodiment further facilitates the inventive method as it is not necessary to flush the polymer article with water, water enriched air or steam and the cross-linking is performed only by allowing the polymer article to stand. This is of particular advantage for the cross-linking of pipes, especially coated steel pipes or aluminium multilayer pipes.

Preferably, the degree of cross-linking obtained in the cross-linkable polymer is at least 40%, more preferably at least 50% and most preferably at least 60%. The degree of cross-linking is measured according to ASTM D 2765.

The polymer article comprising the cross-linkable polymer preferable is a hollow article. Such articles can for example be produced by rotational moulding.

It is particularly preferred that the polymer article of the method of the present invention is a pipe. As examples for pipes may serve water pipes, gas pipes, sewage pipes, coated steel pipes and aluminium multilayer pipes.

Preferably, the polymer article cross-linked in the inventive method is of such a nature that water can penetrate into the article from two sides and thereby cross-link the polymer. For example this is the case for pipes which consist essentially of polymeric material. In such polymer articles the cross-linking is performed particularly effective. However, it is also possible to apply the inventive method to polymer articles which allow the penetration of water only from one side as for example coated steel pipes or aluminium multilayer pipes.

The inventive method is preferably applied to polymer articles which have a wall thickness of not more than 40 mm, preferably not more than 26 mm and most preferred not more than 10 mm. For articles with such wall thicknesses it is ensured that the inventive method provides a high degree of cross-linking which provides a significant improvement of the mechanical properties of the articles.

Where articles with high wall thicknesses are to be cross-linked according to the inventive method it is preferred that the cross-linking is performed up to a penetration depth of about 5 mm measured from the outer surface of the article.

The density of the polymer is decisive for the melting point, surface hardness, permeability and water absorption. If the cross-linkable polymer is polyethylene it is preferred that the density is at least 0.923 kg/m$^3$, more preferably at least 0.924 kg/m$^3$ and most preferably is at least 0.935 kg/m$^3$. If the cross-linkable polymer is polypropylene it is preferred that the density is at least 0.890 kg/m$^3$, more preferably 0.900 kg/m$^3$.

Further preferred, the crystallinity level of the polymer is at least 40% and more preferably at least 50%. The crystallinity level is measured according to ISO 11357/03. A scientific background is given in A. P. Gray, Thermochimica Acta 1970, 1, p. 563.

As is usually the case for polymer compositions, the cross-linkable polymer contained in the polymer article may contain various additives such as miscible thermoplastics, stabilisers, lubricants, fillers, colouring agents and foaming agents.

The cross-linkable silane groups may be introduced into the polymer by co-polymerization or by grafting the silane compound onto the prepared polymer. Details of these techniques are disclosed in U.S. Pat. Nos. 4,413,066; 4,297,310; 4,351,876; 4,398,981; 4,446,283 and 4,456,704. The contents of these documents is included herein by reference.

The silane-group containing polymer preferably contains 0.001 to 15% by weight, more preferably 0.01 to 5% by weight and most preferably 0.1 to 3% by weight of the silane compound.

If the polymer comprises a polyolefin, such as polyethylene, it is preferred that the silane groups are introduced into the polyolefin by grafting. This is preferably done by extruding the polyolefin with vinylene trimethoxy silane (VTMS).

Further preferred, the polyolefin, preferably polyethylene, contained in the polymer article has been produced by a process comprising a single-site catalyst. Such polyolefins will in the following be designated as "single-site polyolefins". Single-site catalysts are defined to have only one type of active site. Typical examples are catalysts comprising a metallocene compound.

It has been found that single-site polyolefins provide a higher efficiency when grafted with silane compounds, particularly when grafted with VTMS, i.e. more VTMS is binding to the polyolefin. Thus, a good conversion percentage is obtained in the grafting and therefore a lower level of silane compound is needed for the grafting. In addition, also the cross-linking of single-site polyolefins is more efficient, i.e. the desired degree of cross-linking can be obtained in shorter time.

As a consequence, articles as e.g. pipes which have been manufactured with single-site polyolefins show a better performance e.g. in pressure tests. This means that in order to obtain the same pressure resistance in a pipe, the density of the single-site polymer material can be reduced with respect to pipes which have been produced with non-single-site catalysts. Therefore, single-site polyolefin pipes are more flexible and are still meeting the DIN standards for pressure resistance.

It is believed that higher conversion in grafting of the single-site polyolefin material is due to an increase of double bonds in the polymer chains compared to conventional produced polymers which favour the grafting of the silane groups. Further, for single-site polyolefins containing 1-hexene as a comonomer, for example, there are more tie molecules (entanglements).

In a preferred embodiment the polymer has been produced by a process comprising a metallocene single-site catalyst. For example, a pipe made of polyethylene with a density of 0.940 g/cm$^3$ which was produced according to such a process easily passes the DIN HDPE-X standard (DIN 16892).

Further preferred, the catalyst comprises a porous particulate support material in which the metallocene compound is impregnated. In a particular preferred embodiment, the metal atom of the metallocene is bound to an amide group which is not bound to an η-ligand of the metallocene. Such single-site catalysts are disclosed in WO 00/34341 the contents of which is enclosed herein by reference.

In a further preferred embodiment the crosslinkable polymer before the final cross-linking step according to the present invention is performed has been partially cross-linked, preferably up to a level of above 20%.

In a further preferred embodiment the polymer has been oriented in at least one direction before the cross-linking is performed. If the polymer is extruded it is preferably oriented at the end of the extrusion process. By the orientation mechanical properties as e.g. pressure test performance and stress load capacity can be improved.

Further preferred the polymer has been oriented biaxially before the cross-linking is performed. As examples of known methods for biaxial orientation of plastic pipes, reference is made to WO 93/19924 the contents of which is included herein by reference.

Further preferred, the polymer has been at least partially cross-linked before the orientation step. A method of production of such material and the use thereof for the manufacture of pressure pipes is described in WO 97/19807 the contents of which is included herein by reference. This step is mainly performed in order to overcome difficulties that arise from the narrow processing window and the rapid relaxation after orientation, in particular for thick-walled products as extruded pipes, sheets, rods, injection and blow-moulded products which are made e.g. of semicrystalline polyethylene or polypropylene.

In this embodiment the silanol condensation catalyst according to formula (I) can as well be used for the cross-linking of the polymer before the orientation step. For this step it is, however, preferred that the cross-linking is performed at higher temperatures than room temperature. The cross-linking after the orientation step is performed according to the inventive method as described herein before. The cross-linking after the orientation step is performed in order to lock the oriented structure, i.e. the oriented pipe will keep its main dimensions and will not act as a shrink tube when heated up.

The cross-linking before the orientation step is preferably carried out up to a level of above 20% of cross-linking, more preferably between 20 and 50%.

Further, in a preferred embodiment the polymer in the inventive method comprises a polyolefin. Preferably, the polyolefin is selected from the group of polypropylene and polyethylene and most preferably the polyolefin is polyethylene.

The inventive method is particularly suited for the cross-linking of medium to high density polyethylene pipes.

The molecular weight distribution of the polyethylene is characterised by way of its melt flow rate (MFR) according to ISO 1133. The melt flow rate is preliminary depending on the mean molecular weight. This is, because long, well packed molecules give the material a smaller flow tendency than short, less packed molecules. An increase in molecular weight means a decrease in MFR value. The melt flow rate is measured in g/10 min of the polymer discharge under specified temperature and pressure conditions and is a measure of the viscosity of the polymer, which in turn for each type of polymer is mainly influenced by its molecular weight distribution, but also by its degree of branching etc. The melt flow rate measured under a load 2.16 kg at 190° C. (ISO 1133, condition 4) is denoted as $MFR_2$, the melt flow rate measured under a load of 5 kg at 190° C. (ISO 1133, condition 18) is denoted as $MFR_5$.

In a preferred embodiment, the polyethylene before the grafting has an $MFR_2$ of 0.1–15 g/10 min, more preferred of 0.2–10 g/10 min and most preferred of 0.3–8 g/10 min. Both the melt flow rate and the density of the material determine the strength properties of the polyethylene.

The molecular weight distribution (MWD) of the polyethylene before the grafting preferably is in the range of 2–12, more preferably 4–10.

Preferably, the polyethylene material forming the pipe comprises a multimodal polyethylene. The expression "modality of a polymer" refers to the form of its molecular weight distribution (MWD) curve, i.e. the appearance of the graph of the polymer weight fraction as a function of its molecular weight. If the polymer is produced in a sequential step process e.g. by utilising reactors coupled in series and using different conditions in each reactor, the different polymer fractions produced in the different reactors will each have their own molecular weight distribution which may considerably differ from one another. The molecular weight distribution curve of the resulting final polymer can be looked at as the superposition of the molecular weight distribution curves of the polymer fractions which will accordingly show two or more distinct maxima or at least be distinctly broadened compared with the curves for the individual fractions. A polymer showing such a molecular weight distribution curve is called "bimodal" or "multimodal", respectively. Multimodal polymers can be produced according to several processes which are described e.g. in WO 92/12182.

The multimodal polyethylene preferably is produced in a multi-stage process in a multi-step reaction sequence such as described in WO 92/12182 ("BORSTAR process"). The contents of this document is included herein by reference. In this process, in a first step ethylene is polymerised in a loop reactor in the liquid phase of an inert low-boiling hydrocarbon medium. Then, the reaction mixture after polymerisation is discharged from the loop reactor and at least a substantial part of the inert hydrocarbon is separated form the polymer. The polymer is then transferred in a second or further step to one or more gas-phase reactors where the polymerisation is continued in the presence of gaseous ethylene. The multimodal polymer produced according to this process has a superior homogeneity with respect to the distribution of the different polymer fractions which cannot be obtained e.g. by a polymer mix.

The catalyst for the production of the ethylene polymer comprises preferably a single-site catalyst such as e.g. a metallocene catalyst. Preferred single-site catalysts are described in EP 688 794, EP 949 274, WO 95/12622 and WO 00/34341. The contents of these documents is included herein by reference.

The multimodal polyethylene comprises a low molecular weight (LMW) ethylene homo- or copolymer fraction and a high molecular weight (HMW) ethylene homo- or copolymer fraction. Depending on whether the multimodal ethylene polymer is bimodal or has a higher modality, the LMW and/or HMW fraction may comprise only one fraction each or two or more subfractions. The expression "ethylene homopolymer" as used herein refers to an polyethylene that consists substantially, i.e. to at least 97% by weight, preferably at least 99% by weight, more preferably at least 99.5% by weight and most preferably at least 99.8% by weight of ethylene.

Preferably, the ethylene polymer is a bimodal polymer consisting of on LMW fraction and one HMW fraction.

It is further preferred that the ethylene polymer comprises an ethylene polymer fraction selected from (a) a LMW ethylene polymer having a density of 0.860–0.970 g/cm$^3$, more preferably from about 0.900–0.950 g/cm$^3$, and an $MFR_2$ of 0.1–5000 g/10 min, more preferably of 25–300 g/10 min, and (b) a HMW polymer having a density of 0.870–0.945 g/cm$^3$, more preferably of 0.870–0.940 g/cm$^3$ and an $MFR_2$ of 0.01–10.0 g/10 min, more preferably of 0.1–3 g/10 min.

Thus, the low molecular weight ethylene polymer preferably is a high density type polyethylene (HDPE) and the high molecular weight ethylene polymer is a linear low density type polyethylene (LLDPE). Preferably, the ethylene polymer comprises both fractions (a) and (b).

At least one fraction of the ethylene polymer preferably is a copolymer which was polymerised with a $C_3$–$C_8$ alpha-olefin, preferably with at least one comonomer selected from the group consisting of propylene, 1-butene, 4-methyl-1-pentene, 1-hexene and 1-octene. Preferably, the amount of comonomer in the ethylene polymer is 0.02–5.0 mol %, more preferably 0.05–2.0 mol %.

Preferably, the HMW fraction is an ethylene copolymer, preferably copolymerised with one of the above-cited comonomers. Further preferred, the LMW fraction of the polyethylene is a homopolymer.

Further, it is preferred that if the polyethylene is produced according to the above-described BORSTAR process the LMW fraction is produced in the loop reactor and the HMW fraction in the gas-phase reactor.

In a preferred embodiment the ethylene polymer comprises 35–55% by weight, preferably 43–51% by weight and most preferred 44–50% by weight of a low molecular weight ethylene polymer component, and 65–45% by weight, preferably 57–49% by weight and most preferred 56–50% by weight of a high molecular weight ethylene polymer component.

In the following the present invention will be further illustrated by means of examples.

EXAMPLE 1

Figure 1:
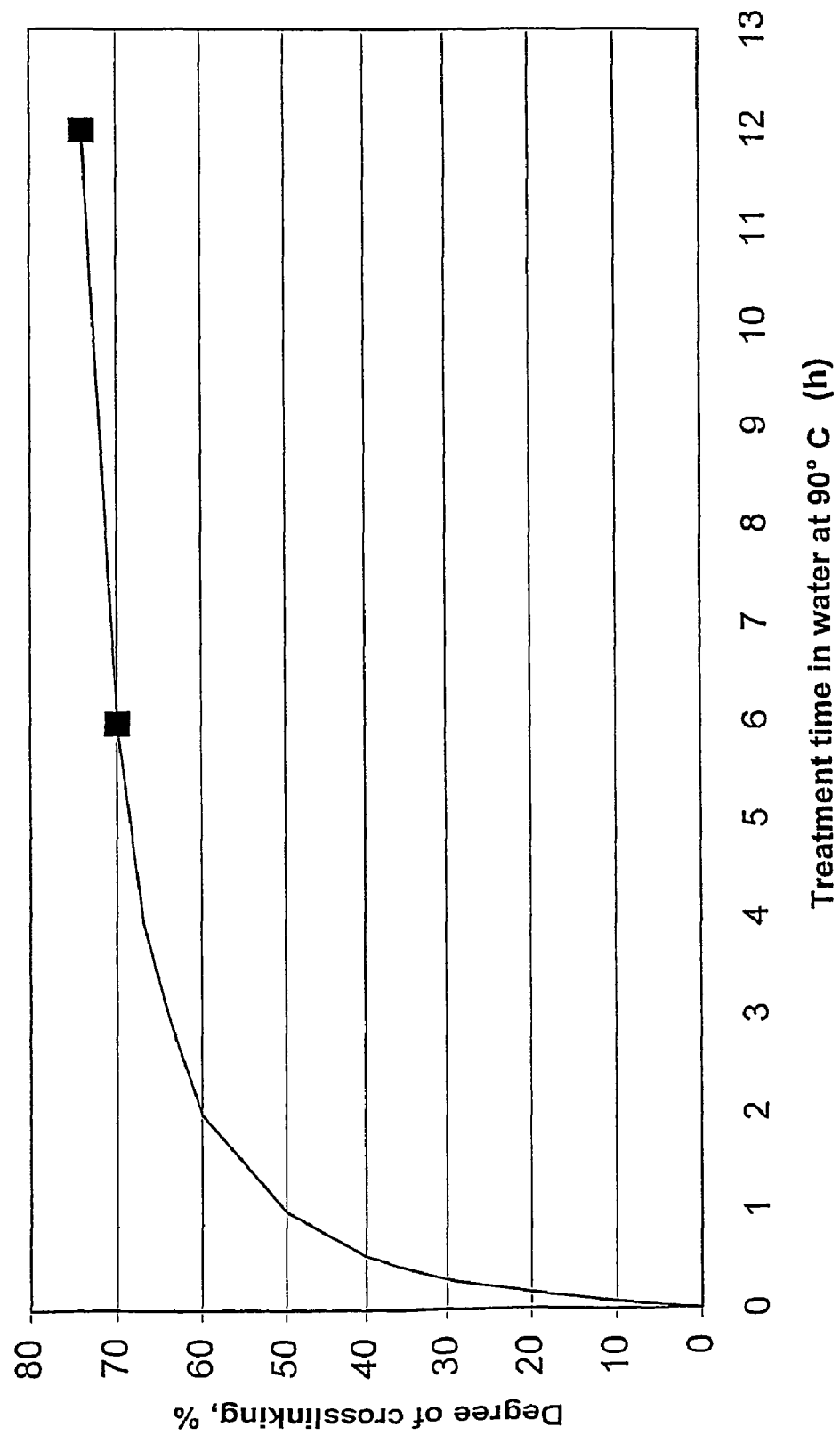
FIG. 1 shows the degree of cross-linking that can be reached by the inventive method as a function of time.

Silane cross-linkable medium density polyethylene (MDPE) product ME4425 having a crystallinity level of 43%, a density of 0.930 g/cm$^3$ and a silane contents of 70 mmole/kg, which had been produced by copolymerisation of ethylene with VTMS, was mixed with 5 wt. % of a master batch containing 1.7 wt. % of dodecyl-benzene sulphonic acid (DBSA, "Ambicat LE4476") as silanol condensation catalyst. The blend was extruded to 32×3 mm natural pipes which were kept in a water bath at 95° C. and checked for gel content after different times.

For comparison, the same material ME4425 was mixed with a standard tin silanol condensation catalyst dibutyl-tin-dilaurate (DBTL, "LE4438"). The amount of LE4438 was chosen so that in the mixture the DBTL contents was 0.01 mol % with respect to the silane contents. The blend was extruded and further treated identical to the DBSA containing material. The results obtained are shown in Table 1.

TABLE 1

32 × 3 mm ME4425 pipes cross-linked at 95° C.

| Blend | Cross-linking degree after 6 h in 95° C. water | Cross-linking degree after 24 h in 95° C. water |
|---|---|---|
| ME4425/LE4438 | 64.1% | 65.6% |
| ME4425/LE4476 | 66.2% | 65.6% |

The results show that cross-linking of pipes can be performed with sulphonic acid catalysts at a reasonable cross-linking rate comparable to this achieved with conventional cross-linking catalysts.

EXAMPLE 2

A parallel experiment to example 1 was done on a silane cross-linkable LDPE product (LE 4421) having a crystallinity level of 34% and a density of 923 kg/m$^3$, making 12×2 mm pipes instead. For cross-linking, the pipes were stored at room temperature. The MDPE product ME4425 of example 1 was included as well. The silanol condensation catalyst used and their contents were the same as in example 1. The results of the experiments are shown in Table 2.

TABLE 2

12 × 2 mm pipes stored in Stenungsund/Sweden, August 1999.

| Blend | Cross-linking degree after storage at room temperature for 30 days |
|---|---|
| LE4421 + LE4438 | 47% |
| LE4421 + LE4476 | 80% |
| ME4425 + LE4438 | 34% |
| ME4425 + LE4476 | 57% |

These results show that the degree of cross-linking by storage at room temperature is much higher if the catalyst LE4476 is used. This is true for both the polymer with a crystallinity level of 34% and a density of 0.923 g/cm$^3$ as well as for the polymer with a crystallinity level of 43% and a density of 0.930 g/cm$^3$.

EXAMPLE 3

In this experiment, MDPE ("ME8154") with a crystallinity level of 59% and a density of 0.940 g/cm$^3$ and HDPE ("MG7547") with a crystallinity level of 68% and a density of 0.954 g/cm$^3$ were investigated in terms of cross-linkability using LE4476 silanol condensation catalyst at 95° C. in water for 6 h. The silane was grafted to the polymers by means of compounding equipment using 140 mmol/kg VTMS. The catalyst was mixed with the polymers in a masterbatch according to example 1 to give a final content in the polymers of 2.6 mmol/kg. The materials after mixing with the catalyst masterbatch were extruded to pipes (32×4.4 mm). The results are presented in Table 3.

TABLE 3

Pipes (32 × 4.4 mm) cross-linked at 95° C. in water for 6 h using Ambi-cat LE4476 catalyst.

| Blend | Cross-linking degree |
|---|---|
| ME8154/LE4476 | 70% |
| MG7547/LE4476 | 55% |

EXAMPLE 4

In this example, the same MDPE pipe as in example 3 was blended with LE4476 in the same amount as in example 1, extruded to pipes (32×4.4 mm) and cross-linked at ambient temperature (20–25° C., indoor, Stenungsund, 1–15 Jun. 2000) for 15 days. The results are exhibited in Table 4 below.

TABLE 4

Pipe (32 × 4.4 mm) cross-linked in air at room temperature for 15 days.

| Blend | Cross-linking degree |
|---|---|
| ME8154/LE4476 | 60% |

EXAMPLE 5

In this example, the advantage of using a single-site polyolefin compared to a non-single-site polyolefin is shown. As single-site polymer, polyethylene RM8402 with a crystallinity level of 58%, an $MFR_2$ of 6 and a MWD of 2 was used. As non single-site material, an unimodal Ziegler grade MG7547 with a crystallinity level of 68%, an $MFR_2$ of 4 and a MWD of 5–6 was used.

The silane was grafted to the polymers by means of compounding equipment using the amount of VTMS indicated in table 5 with the polymer. The catalyst was mixed with the polymers in a masterbatch according to example 1 to give a final content in the polymers of 2.6 mmol/kg.

From this material, a pipe was extruded.

TABLE 5

Cross-linking degree measured after different times:

| | Cross-linking degree [wt %] (1.2 wt % VTMS added) | Cross-linking degree [wt %] (1.6 wt % VTMS added) | Cross-linking degree [wt %] (2.0 wt % VTMS added) |
|---|---|---|---|
| after 6 hours | | | |
| RM8402 | 50 | | 70 |
| MG7547 | 54.5 | | 42.2 |
| after 12 hours | | | |
| RM8402 | 59.4 | 71 | 77.2 |
| MG7547 | 61 | 56 | 62 |

From Table 5 it can be seen that although it could be expected that the polymer with a lower $MFR_2$ should cross-link more easily than polymer with higher $MFR_2$, the cross-linking degree in RM8402 is equal or better compared to MG7547.

EXAMPLE 6

The same two polymer grades as compared in Example 5 were compared in terms of grafting performance, e.g. how much of a given quantity of VTMS which was actually fed into the compounding equipment (wt. % VTMS injected) is actually grafted onto the backbone of the PE-chain (conversion).

The results of these experiments are shown in table 6. It can be seen that the conversion is significantly higher for the single-site grade RM8402 as compared to the reference MG7547.

TABLE 6

Conversion rates in VTMS grafting.

| | VTMS injected/wt. % | Conversion/% |
|---|---|---|
| RM8402 | 1.2 | 71 |
| | 1.6 | 79 |
| | 2.0 | 83 |
| MG7547 | 1.2 | 50 |
| | 1.6 | 71 |
| | 2.0 | 78 |

EXAMPLE 7

In this example, the polymer ME8154 was grafted with 2.0 wt % VTMS and was compounded with the amount of silanol condensation catalyst as given in example 1. The material was then extruded to pipes.

FIG. 1 shows the cross-linking results in 90° C. water using the silanol condensation catalyst Ambicat LE4476 as a function of the treatment time. The required 20% cross-linking level for beneficial orientation will be reached in less than 15 min, i.e. in a reasonable time frame for a commercial process.

EXAMPLE 8

In this example, the grafted and compounded polymer composition according to Example 7 was extruded to pipes and was partially cross-linked in 90° C. hot water up to a cross-linking degree of 20%. After partial cross-linking, the material was oriented.

The material was then stored (cross-linked) at RT conditions during 14 days after extrusion. A cross-linking degree according to table 7 was reached, which shows the ability of the material to cross-link at these conditions.

It can be concluded that for the partially cross-linked (>20% cross-linking degree) and oriented material according to the described principles, a corresponding continuation of the cross-linking process will take place leading to a locking of the structure.

TABLE 7

| Blend | cross-linking degree after at 14 days RT |
|---|---|
| ME8154/LE4476 | 57–59% |

The invention claimed is:

1. Method for cross-linking a polymer article comprising a cross-linkable polymer with an hydrolysable silane group, which has been produced by the use of a single-site catalyst and has a crystallinity level of at least 30% wherein the cross-linking is performed in the presence of a silanol condensation catalyst comprising a compound of formula (I):

$$ArSO_3H \qquad (I)$$

or a precursor thereof, Ar being a hydrocarbyl substituted aromatic group comprising at least 14 carbon atoms.

2. Method according to claim 1 wherein the polymer article is hollow.

3. Method according to claim 1 wherein the polymer article is a pipe.

4. Method according to claim 1 wherein the cross-linking is performed at a temperature below 80° C.

5. Method according to claim 1 wherein the polymer is a polyethylene with a density of at least 923 kg/m$^3$.

6. Method according to claim 1 wherein Ar is a hydrocarbyl substituted benzene or naphthalene ring, the hydrocarbyl radical or radicals containing 8 to 20 carbon atoms in the benzene case and 4 to 18 carbon atoms in the naphthalene case.

7. Method according to claim 6, wherein the catalyst is selected from the group of dodecyl benzene sulphonic acid and tetrapropyl benzene sulfonic acid.

8. Method according to claim 1, wherein the single-site catalyst comprises a porous particulate support material having impregnated therein a metallocene compound, the metal atom whereof is bound to an amide group which is not bound to an η-ligand of the metallocene.

9. Method according to claim 1, wherein the polymer has been oriented in at least one direction before the cross-linking is performed.

10. Method according to claim 9, wherein the polymer has been oriented biaxially.

11. Method according to claim 9, wherein the polymer has been at least partially cross-linked before the orientation step.

12. Method according to claim 11, wherein the cross-linking before the orientation step is performed to a level of at least 20%.

13. Method according to claim 2 wherein the polymer article is a pipe.

14. Method according to claim 2 wherein the cross-linking is performed at a temperature below 80° C.

15. Method according to claim 2 wherein the polymer is a polyethylene with a density of at least 923 kg/m$^3$.

16. Method according to claim 4 wherein the polymer is a polyethylene with a density of at least 923 kg/m$^3$.

17. Method according to claim 2 wherein Ar is a hydrocarbyl substituted benzene or naphthalene ring, the hydrocarbyl radical or radicals containing 8 to 20 carbon atoms in the benzene case and 4 to 18 carbon atoms in the naphthalene case.

18. Method according to claim 4 wherein Ar is a hydrocarbyl substituted benzene or naphthalene ring, the hydrocarbyl radical or radicals containing 8 to 20 carbon atoms in the benzene case and 4 to 18 carbon atoms in the naphthalene case.

19. Method according to claim 5 wherein Ar is a hydrocarbyl substituted benzene or naphthalene ring, the hydrocarbyl radical or radicals containing 8 to 20 carbon atoms in the benzene case and 4 to 18 carbon atoms in the naphthalene case.

20. Method according to claim 10, wherein the polymer has been at least partially cross-linked before the orientation step.

* * * * *